United States Patent [19]

Joy et al.

[11] Patent Number: 5,524,478
[45] Date of Patent: Jun. 11, 1996

[54] METHOD AND APPARATUS FOR TESTING BAG-LIKE MEANS

[75] Inventors: Brian Joy, Sawston; Rod Smith, Saffron Walden; John Skingsley, Letchworth; Ian Rhodes, Royston, all of United Kingdom

[73] Assignee: Chartex International plc, London, England

[21] Appl. No.: 417,472

[22] Filed: Apr. 5, 1995

Related U.S. Application Data

[63] Continuation of Ser. No. 96,976, Jul. 27, 1993, abandoned.

[30] Foreign Application Priority Data

Jul. 28, 1992 [GB] United Kingdom ............... 9216041

[51] Int. Cl.⁶ .................................................. G01M 3/02
[52] U.S. Cl. .................................................. 73/40; 73/40.7
[58] Field of Search ............................ 73/40, 40.7, 41, 73/45, 45.2

[56] References Cited

U.S. PATENT DOCUMENTS

| | | | |
|---|---|---|---|
| 2,383,936 | 9/1945 | Hohl | 73/40 |
| 2,800,788 | 7/1957 | Smith | 73/40 |
| 3,374,887 | 3/1968 | Paruolo et al. | 209/73 |
| 3,708,949 | 1/1973 | Wilcox | 53/53 |
| 3,785,195 | 1/1974 | Yasuhiro et al. | 73/37 |
| 3,992,766 | 11/1976 | Field | 29/235 |
| 4,010,877 | 3/1977 | Hayes et al. | 223/37 |
| 4,733,555 | 3/1988 | Franks | 73/49.3 |
| 5,049,168 | 9/1991 | Danielson | 55/17 |
| 5,073,482 | 12/1991 | Goldstein . | |
| 5,097,697 | 3/1992 | Carnal et al. | 73/40 |
| 5,129,256 | 7/1992 | McGlothlin | 73/40 |
| 5,138,871 | 8/1992 | Retta et al. | 73/40.7 X |

FOREIGN PATENT DOCUMENTS

| | | | |
|---|---|---|---|
| 159476 | 7/1957 | Sweden | 73/40 |
| 1167465A | 7/1985 | U.S.S.R. | 73/45.1 |
| 2234596 | 6/1991 | United Kingdom . | |

OTHER PUBLICATIONS

European Search Report, The Hague, Dec. 30, 1993.

Primary Examiner—Hezron E. Williams
Assistant Examiner—J. David Wiggins
Attorney, Agent, or Firm—Levy, Zito & Grandinetti

[57] ABSTRACT

An apparatus for simultaneously detecting leaks in a plurality of flexible, collapsible bag-like devices is disclosed. The apparatus comprises a platen having a plurality of openings for receiving bag-like devices or contraceptive devices such as a female condom made of latex, polyurethane, or other polymer material. The apparatus has a first pressurizing device for pressuring the bag-like device in the platen with a medium such as air. A pressure sensor is used for detecting a failure to hold a selected pressure in each of the pressurized bag-like devices. The apparatus has an identification device for identifying bag-like devices exhibiting a failure to hold the selected pressure. An evacuation device for evacuating the bag-like device is used. The apparatus has a second pressurizing device for pressurizing the bag-like device with a leak detection medium and a detector for detecting any leak detection medium leaking from the bag-like device. A method for testing bag-like devices or contraceptive devices is, also, disclosed.

21 Claims, 3 Drawing Sheets

METHOD AND APPARATUS FOR TESTING BAG-LIKE MEANS

This application is a continuation of U.S. patent application Ser. No. 096,976, filed Jul. 27, 1993, now abandoned.

BACKGROUND OF THE INVENTION

1. Field of the Invention

This invention relates to a method and an apparatus for testing bag-like means, specifically, the invention is a method and an apparatus for testing prophylactics and contraceptive devices of the condom-like variety, especially female contraceptives.

2. Description of Related Art

Plastic and natural polymer articles made from two or more sheets or plies of material are commonly manufactured for use as bags, gloves, contraceptives, and other devices. These devices, when they serve as medical devices, must be tested so as to provide a product of consistent quality. Many methods and apparatuses known in the art lack the ability to test a large volume of articles, such as medical devices, with consistent quality.

U.S. Pat. No. 4,733,555 to Franks discloses a pressure entry and test system. The device of this patent both seals an open end of an article and pressure tests the article. This device is not suitable for use with a large volume of articles to be tested in an assembly line fashion.

U.S. Pat. No. 5,049,168 to Danielson discloses a helium leak detection method and system. The device of this patent can provide reliable testing of articles, but is not readily adaptable for an assembly line production system.

The industry is lacking a method and an apparatus for testing medical grade, multiple ply plastic articles in a high speed assembly line production system.

SUMMARY OF THE INVENTION

The invention includes an apparatus for simultaneously detecting leaks in a plurality of flexible, collapsible bag-like means. The apparatus comprises a platen having a plurality of openings or apertures for receiving and supporting bag-like means or contraceptive devices such as a female condom made of latex, polyurethane, or other polymer. The apparatus has a first pressurizing means for pressuring the bag-like means in the platen with a pressurizing medium such as air. A pressure sensor means is used for detecting a selected pressure loss or failure to hold the selected pressure from each of the pressurized bag-like means. The apparatus has an identification means for identifying bag-like means exhibiting the selected pressure loss or failure to hold a selected pressure. An evacuation means for evacuating the bag-like means is used. The apparatus has a second pressurizing means for pressurizing the bag-like means with a leak detection medium and a detection means for detecting the leak detection medium leaking from the bag-like means.

The invention, also, includes a method for simultaneously detecting leaks in a plurality of flexible, collapsible bag-like means comprising the following steps. Positioning a plurality of the bag-like means occurs on a platen wherein the platen has a plurality of apertures and each aperture is adapted to receive and retain one of the bag-like means. Pressurizing each of the bag-like means to a selected pressure then occurs. Detecting any pressure loss from each of the bag-like means and identifying any bag-like means exhibiting a failure to maintain the selected pressure is performed. Evacuating each bag-like means and charging each bag-like means with a leak detection medium occurs. Then, detecting any leak of the leak detection medium from the bag-like means is performed.

BRIEF DESCRIPTION OF THE DRAWINGS

This invention can be performed in various ways and one specific embodiment, the preferred embodiment, will now be described by way of example with reference to the accompanying drawings in which.

DESCRIPTION OF THE PREFERRED EMBODIMENTS

The preferred embodiment of the invention is part of a machine or apparatus for making and testing bag-like means or contraceptive devices. The "method of and apparatus for making bag-like means" is described in more detail in the Applicant's co-pending U.K. Patent Application No. 93 08453.1.

The apparatus for making and testing bag-like means comprises a plurality of individual processing stations connected together in an assembly line arrangement. Each individual processing station performs a separate work task in the manufacture or testing of the bag-like means. The individual processing stations are fully automated and can be removed and substituted with an improved individual processing station as the technology for a particular work task changes.

The preferred embodiment of the apparatus for making and testing bag-like means includes the following individual processing stations. A processing station for welding or joining a ring-like structure to the open end of a preformed bag-like means can be utilized to form the bag-like means. The formed bag-like means is then injected or transferred to a transporting means. Desirably, the transporting means is a platen. The platen supports and transports the formed bag-like means to a processing station for testing bag-like means. The tested bag-like means can be transported to an optional processing station for inserting an inner ring or other device into the bag-like means. Additionally, the bag-like means can be transported to an optional processing station for lubricating the bag-like means. A processing station for sorting bag-like means then separates rejected bag-like means from acceptable bag-like means. The acceptable bag-like means are then transported to a processing station for packaging the bag-like means.

Figure 1:
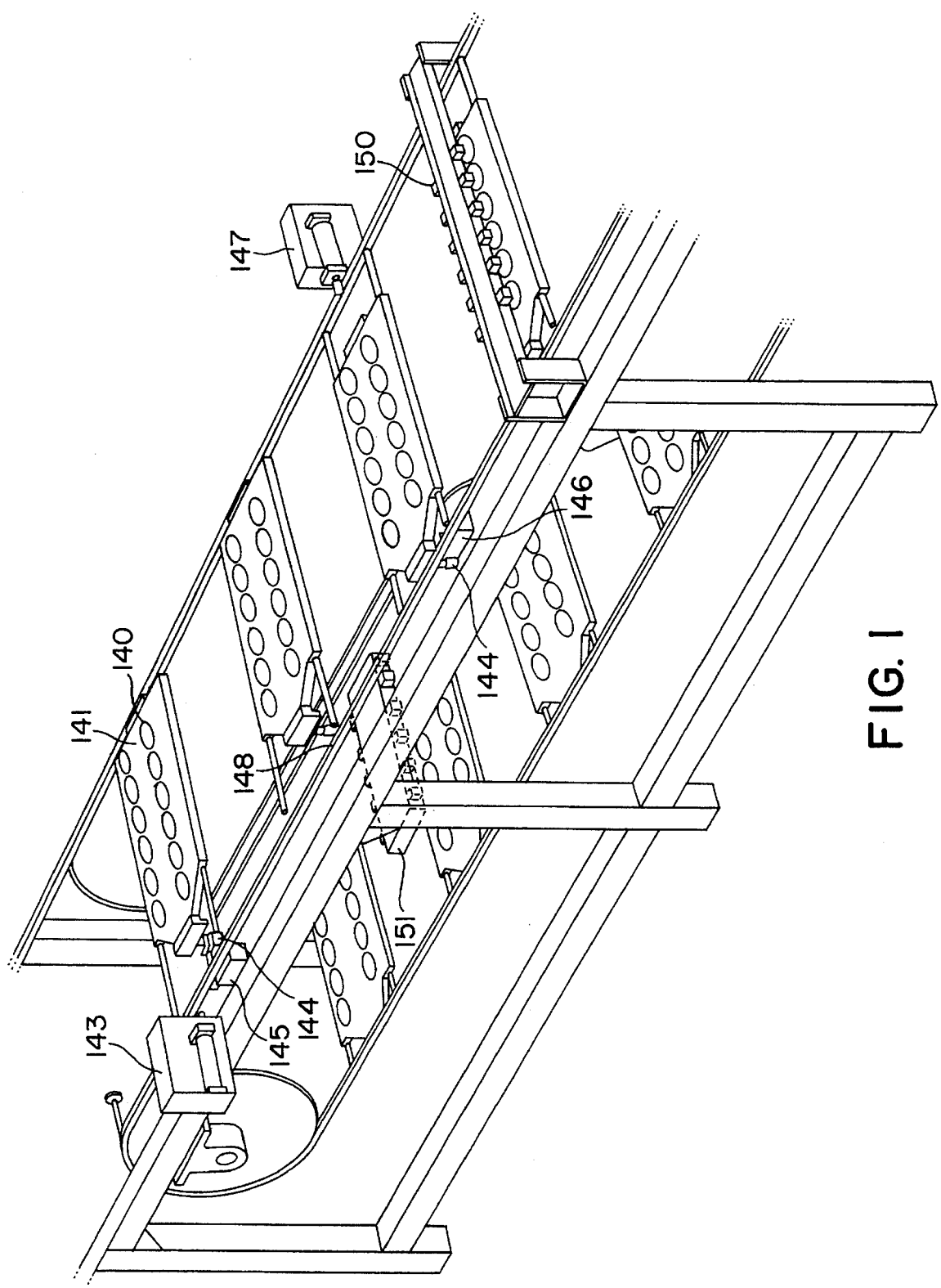
FIG. 1 shows means by which the contraceptives to be tested are conveyed to the testing apparatus on platens.
Figure 3:
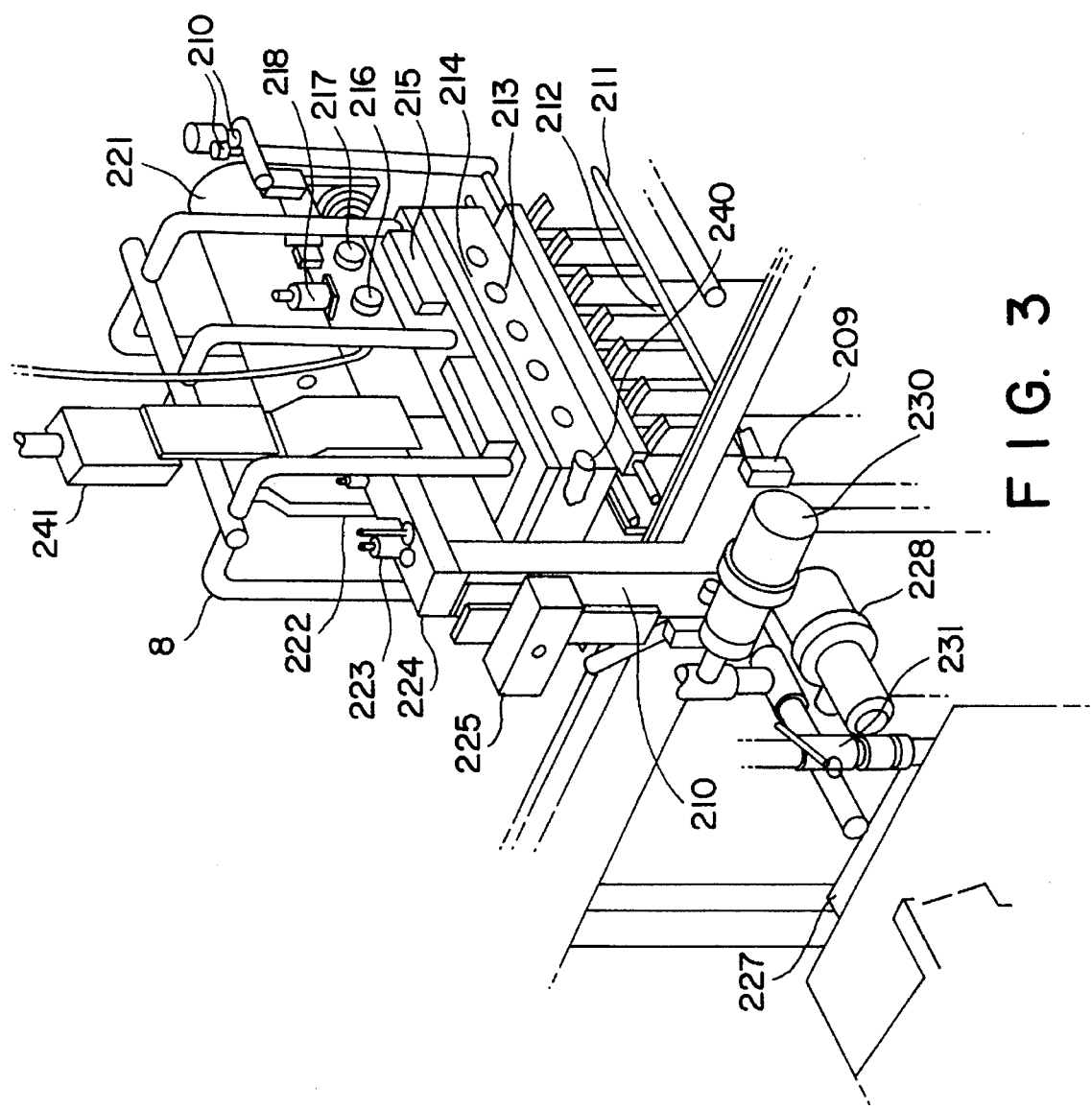
FIG. 3 is a view of the leak testing apparatus.

FIG. 1 illustrates the platens 141 and a conveying apparatus for moving the platens 141 from the processing station for welding or joining a ring-like structure to the open end of a preformed bag-like means to the testing unit 8 shown in FIG. 3. For example, an individual platen 141 waits for the formed bag-like means until twelve contraceptives are loaded into openings 140. The platen 141 is transported on a conveying system 142 by a motor means (not shown) and is guided by platen shuffles 143 and 147. Each platen 141 has a platen check sensor 144 and a platen home sensor 148. The platen check sensor 144 or the platen home sensor 148 are received by a plurality of rotary gates 145 and 146 at specified positions on the conveying system 142. The receipt of the platen check sensor 144 or the platen home sensor 148 by a rotary gate transmits a signal to a control means (not shown). The control means, such as a central computerized control system, can then actuate or terminate a function in the manufacture or testing of the bag-like means. A platen "full" sensor 150 and a platen "empty" sensor 151 are positioned on the conveying system 142 so as to identify the openings 140 on a platen 141 that are, respectively, holding a bag-like means or empty.

Figure 2:
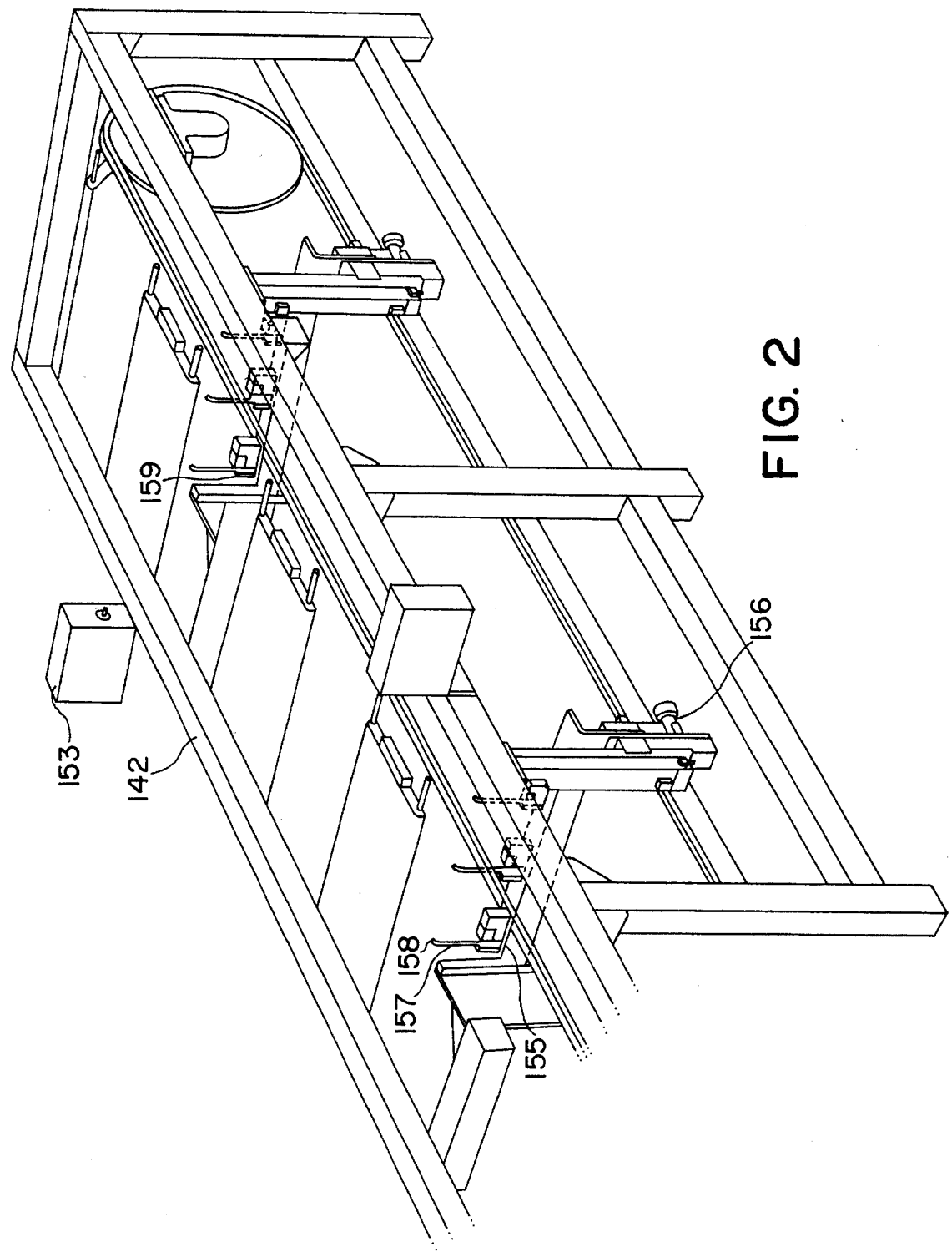
FIG. 2 is a similar view taken from the other end of the conveying apparatus.

FIG. 2 illustrates the conveying apparatus for moving the platens 141 from the testing unit 8 of FIG. 3 to the processing station for sorting bag-like means in order to separate rejected bag-like means from acceptable bag-like means. This section of the conveying system 142, also, has a plurality of platen shuffles 152 and 153. The bag-like means are moved into or out of an opening 140 of a platen 141 by a jet of pressurized air or a vacuum. For example, the conveying system 142 has a plurality of vacuum generators 155 and air regulators 156 to create a vacuum. The suction of the vacuum is directed to affect the position of a bag-like means in the openings 140 by a plurality of transfer rods 157 and vacuum suckers 158. A similar unit utilizes pressurized air and a plurality of air jets 159 to affect the position of a bag-like means in the openings 140.

This invention is an apparatus for testing bag-like means or a "testing unit". This invention can be a processing station within the overall apparatus for making and testing bag-like means as described above.

The bag-like means or "manufactured contraceptives" are transported via the platens 141 to the testing unit 8 shown in FIG. 3. The testing unit 8 tests the bag-like means for leaks or holes. The testing unit 8 includes a first pressurizing means having a header with a plurality of gas inlets. The header is movably disposed for contacting the platen in a sealing relationship so that each gas inlet is in communication with the bag-like means in the platen. The apparatus can include a header having a sealing means around each gas inlet for sealing each of the bag-like means in the platen. The header includes a first valve means for selectively introducing a pressurizing medium, such as a gas, into the bag-like means. The header includes a second pressurizing means and a second valve means for selectively introducing a leak detecting medium, such as helium, into each bag-like means. The apparatus, desirably, includes an identification means with a means for controlling the second valve means in response to the identification of a bag-like means that exhibits a failure to hold the selected pressure. An evacuation means is, desirably, coupled to the header.

The apparatus of the invention further comprises a collection tray and means for positioning the collection tray in a sealing relationship with a platen in the testing unit. The collection tray collects any leak detection medium leaked from the bag-like means. A means for removing leak detection medium from the collection bag-like means is used to transfer the leak detection medium to the detection means. The apparatus includes a molecular sieve to separate the pressurizing medium, such as air contained in the collection tray, from the leak detection medium, such as helium. The separated leak detection medium passes to the detection means. The detection means can be a mass spectrometer for detecting the leak detecting medium. The apparatus, desirably, includes a means for purging the leak detecting medium from the bag-like means.

FIG. 3 illustrates the preferred processing station for testing bag-like means of this invention in more detail. The testing unit 8 of the preferred embodiment of the invention, as shown in FIG. 3, comprises a frame 210. The frame 210 carries side flaps 211, a helium collection tray 212, twelve bag seals 213, twelve solenoid valves 214, twelve pressure switches 215, a helium regulator 216, a reservoir pressure indicator 217, helium charge valves 218, vacuum extract valves 220, a helium reservoir 221, a helium intake valve 222, an air intake valve 223, a manifold pressure transducer 224, a station raise and lower switch 225, and a raise and lower flap 209. There is, also, provided a mass spectrometer or detector 229, an impinger or a molecular sieve 227, a sample valve 228, a purge valve 230, and a manual valve 231. An extraction shroud 240 and a shroud flow switch 241 are either raised from a movable platen 141 or lowered onto a movable platen 141 holding bag-like means.

The method for testing bag-like means at the processing station of this invention involves the following steps. The method begins when the platen 141 is moved into the required position within the processing station for testing bag-like means. One or more of the openings 140 in the platen 141 hold a bag-like means. The openings 140, desirably, have a cylinder portion that rises above the surface of the platen 141 and to from the aperture or opening 140. The diameter of the cylinder is less than the diameter of the ring that is welded to the open end of the bag-like means. The closed end of the bag-like means is placed in or through the aperture or opening 140 such that the ring about the open end of the bag-like means drops down the outside of the cylinder and rests on the surface of the platen 141. The preferred embodiment of the testing unit, as described below, has twelve openings 140 on each platen 141 so that twelve bag-like means can be tested simultaneously. The invention can be adapted to test any number of bag-like means.

The method first raises the side flaps 211 on each side of a positioned platen 141 so that an enclosure is formed by the side flaps 211 and header around the bag-like means or contraceptive devices that are to be tested. The header or "sealing head" with twelve bag seals 213 then moves down into position on the platen 141. Mounted to the header is a first pressurizing means. The header is movably disposed for contacting the platens 141 in a sealing relationship so that each gas inlet is in communication with a bag-like means in the platen 141. The header is, desirably, mounted above the conveyer for reciprocating movement with the transported platens.

The twelve bag seals 213 comprise twelve individually gimbled heads (not shown). Each gimbled head forms a seal on each open end of each bag-like means held in the openings 140 of the platen 141. The individually gimbled head permits simultaneous testing of a plurality of bag-like means. If there is a defect in one bag-like means, it will not affect the testing of the other bag-like means.

The air inlet valve 223 is then opened for a short interval of approximately one second to inflate the bag-like means. The air pressure in each bag-like means is then determined by the pressure switches 215. This pressure test identifies and registers with the control means, such as a central computerized control system, any individual bag-like means that has a gross leak. The air is then evacuated from the bag-like means and the pressure switches, via the control means, disable all the heads for the bag-like means that did not pass the gross leak test. The remaining heads are then charged by the helium charge valves 218 so as to pass helium into the bag-like means. Helium is the preferred test gas for the preferred embodiment of the invention, but other test mediums or gases can be used with the invention.

The method then involves opening the sample valve 228 to enable the air on the underside of the platen 141 and any helium, which may have leaked through the bag-like means, to be pumped to the molecular sieve 227. The molecular sieve 227 enables any leaked helium to pass into the detector 229 while the main volume of air is pumped out of the molecular sieve 227 as exhaust. The detector 229, thus, is able to determine whether there is any leaked helium and, consequently, test the integrity of each bag-like means in the platen 140. Another desirable embodiment of the invention permits leaked helium to be channeled to the detector for each individual bag-like means, however, this embodiment can slow the overall production process.

Once the detector 226 determines whether the platen is usable or not, the sample valve 228 is closed and the purge valve 230 is opened. This method step cleans the helium collection tray 212 of any residual helium for the next test. Clean air is then pumped to the valves to reseat the bags and the sealing head is then raised and the side flaps 209 are lowered so that tested platen 141 can be transported away and the next platen can be positioned for testing. The platen 141 is passed to the processing station for sorting bag-like means.

Thus the present invention provides a simple and effective method of and apparatus for testing bag-like means.

We claim:

1. An apparatus for simultaneously detecting leaks in a plurality of flexible, collapsible bag-like means comprising:

at least one platen having a plurality of apertures for supporting and receiving bag-like means;

first pressurizing means for pressurizing said bag-like means in said platen with a pressurizing medium;

pressure sensor means for detecting a failure to hold a selected pressure in each of said pressurized bag-like means;

identification means for identifying bag-like means exhibiting said failure to hold said selected pressure;

evacuation means for evacuating said bag-like means;

second pressurizing means for pressurizing said bag-like means with a leak detection medium, where the second pressurizing means is to be applied only to each of said pressurized bag-like means that are able to withstand without failure said selected pressure of said first pressurizing means; and detection means for detecting any said leak detection medium leaking from said bag-like means.

2. The apparatus of claim 1, further comprising a conveyer for transporting a plurality of said platens, to and from said apparatus for simultaneously detecting leaks in a plurality of bag-like means.

3. The apparatus of claim 2, wherein said first and second pressurizing means comprises at least one gas source and a header having a plurality of gas inlets, said header being movably disposed for contacting said platen in a sealing relationship so that each said gas inlet is in communication with one bag-like means in said platen.

4. The apparatus of claim 3, wherein said header is mounted above said conveyer for reciprocating movement with said transported platens.

5. The apparatus of claim 4, wherein said header further comprises a sealing means around each said gas inlet for individually sealing each of said bag-like means in said platen.

6. The apparatus of claim 3, claim 4, or claim 5, wherein said header further comprises first valve means for selectively introducing said pressurizing medium into said bag-like means.

7. The apparatus of claim 6, wherein said header comprises a second valve means for selectively introducing said leak detection medium into each bag-like means.

8. The apparatus of claim 7, wherein said identification means comprises means for controlling said second valve means in response to a bag-like means exhibiting said failure to hold said selected pressure.

9. The apparatus of claim 1, further comprising a collection tray and means for sealing said collection tray with said platen, said collection tray collects said leak detection medium leaked from said bag-like means.

10. The apparatus of claim 9, further comprising means for removing leak detection medium from said collection means and transferring said leak detection medium to said detection means.

11. The apparatus of claim 10, further comprising a molecular sieve, said molecular sieve separates said pressurizing medium from said leak detection medium before said leak detection medium is transferred to said detection medium.

12. The apparatus of claim 11, wherein separated leak detection medium passes to detection means, said detection means being a mass spectrometer for detecting said leak detecting medium.

13. The method of claim 12, wherein said leak detection medium is helium.

14. The apparatus of claim 1, further comprising means for purging said leak detecting medium from said bag-like means.

15. A method for simultaneously detecting leaks in a plurality of flexible, collapsible bag-like means comprising the steps of:

positioning a plurality of said bag-like means on a platen, said platen having a plurality of apertures, each aperture being adapted to receive and retain one of said bag-like means;

pressurizing each of said bag-like means to a selected pressure with a pressurizing medium;

detecting any failure to hold said selected pressure in each of said bag-like means and identifying any bag-like means exhibiting said failure to hold said selected pressure;

evacuating each bag-like means;

charging each bag-like means with a leak detection medium, where the charging is only performed on each of said bag-like means that are able to withstand without failure said selected pressure of said pressurizing; and detecting any leak of said leak detection medium from said bag-like means.

16. The method of claim 15, wherein said pressurizing is performed individually for each of said bag-like means by one of a plurality of pressurizing means.

17. The method of claim 16, further comprising deactivating a selected pressurizing means for an identified bag-like means exhibiting a failure to hold said selected pressure.

18. The method of claim 15 or claim 16, further comprising positioning and sealing said platen on a collection tray for collecting said leak detection medium leaking from said bag-like means.

19. The method of claim 18, further comprising withdrawing a mixture of said pressurizing medium and said leak detection medium from said collection tray and separating said pressurizing medium from said leak detection medium by a molecular sieve.

20. The method of claim 19, further comprising passing said mixture through a molecular sieve to separate said pressure medium and said leak detection medium, said pressure medium being vented as exhaust and separated leak detection medium being passed to a means for detecting said leak detection medium.

21. The method of claim 15, further comprising purging said bag-like means and platen with air.

* * * * *